US009328794B2

(12) United States Patent
Casimir et al.

(10) Patent No.: US 9,328,794 B2
(45) Date of Patent: May 3, 2016

(54) HYDRAULICALLY DAMPED DRIVE TRAIN MOUNTS

(75) Inventors: Michael Casimir, Völklingen (DE); Benjamin Röder, Saarbrücken (DE)

(73) Assignee: HYDAC ELECTRONIC GMBH, Saarbruecken (DE)

( * ) Notice: Subject to any disclaimer, the term of this patent is extended or adjusted under 35 U.S.C. 154(b) by 58 days.

(21) Appl. No.: 13/261,778

(22) PCT Filed: May 18, 2011

(86) PCT No.: PCT/EP2011/002477
§ 371 (c)(1),
(2), (4) Date: Mar. 7, 2014

(87) PCT Pub. No.: WO2012/155933
PCT Pub. Date: Nov. 22, 2012

(65) Prior Publication Data
US 2014/0197585 A1 Jul. 17, 2014

(51) Int. Cl.
*F16F 13/10* (2006.01)
*F16F 13/08* (2006.01)
*F16F 13/26* (2006.01)

(52) U.S. Cl.
CPC ................. *F16F 13/08* (2013.01); *F16F 13/10* (2013.01); *F16F 13/26* (2013.01); *F16F 13/268* (2013.01)

(58) Field of Classification Search
CPC ......... F16F 13/268; F16F 13/10; F16F 13/26; F16F 13/102; F16F 13/105
USPC .......................... 267/140.11, 140.13, 140.14
See application file for complete search history.

(56) References Cited

U.S. PATENT DOCUMENTS 5,092,566 A * 3/1992 Freudenberg ............ 267/140.14
6,364,295 B1 * 4/2002 Wolf et al. ............... 267/140.14
6,679,486 B2 * 1/2004 Muramatsu et al. ..... 267/140.13
6,708,963 B2 * 3/2004 Nishi et al. ............... 267/140.14
6,808,168 B2 * 10/2004 Muramatsu et al. ..... 267/140.13
7,210,674 B2 * 5/2007 Maeno et a ............. 267/140.13
8,016,274 B2 * 9/2011 Adams ..................... 267/140.13
2011/0042873 A1 * 2/2011 Yamamoto et al. ...... 267/140.14

FOREIGN PATENT DOCUMENTS

DE 103 55 199 A1 6/2005
JP 62 127538 A 6/1987
JP 8 072 561 A 3/1996

* cited by examiner

*Primary Examiner* — Thomas Irvin
(74) *Attorney, Agent, or Firm* — Wenderoth, Lind & Ponack, L.L.P.

(57) ABSTRACT

A hydraulically drive train mount (1), in particular for a motor vehicle, includes a mount housing (2) in which an elastic mount body (3) is arranged in a partially movable manner. The elastic mount body at least partially encloses a first fluid chamber (4) and has a fluid-filled equalization chamber (6) sealed by a sealing element (5) that can be moved in the mount housing (2). A membrane (7) arranged in the mount housing (2) separates the first fluid chamber (4) from the equalization chamber (6). The pressure in the equalization chamber (6) can be adjusted by the sealing element (5) that is formed as an axially movable piston (8).

20 Claims, 3 Drawing Sheets

HYDRAULICALLY DAMPED DRIVE TRAIN MOUNTS

FIELD OF THE INVENTION

The invention relates to a hydraulically damped drive train mount, in particular for a motor vehicle, having a mount housing, in which an elastic mount body is disposed to be displaceable. The elastic mount body at least partially encloses a first fluid chamber and has a fluid-filled equalization chamber sealed by a sealing element that can be displaced in the mount housing. A membrane disposed in the mount housing separates the first fluid chamber from the equalization chamber.

BACKGROUND OF THE INVENTION

DE 40 21 039 C2 describes a hydraulically damping drive train mount having a working chamber or first fluid chamber disposed on top, and an equalization chamber or second fluid chamber disposed below. The working chamber is enclosed by a suspension spring that receives the weight of the drive unit. The two chambers are separated from one another by a wall having an annular channel. The hydraulic fluid can overflow from the working chamber into the equalization chamber by the annular channel when the drive train mount is pressurized. Conversely, the hydraulic fluid can flow back when the load is removed from the drive train mount. In addition to the internal friction of the suspension spring, a hydraulic damping of the drive train mount is also achieved in this manner. In particular, the annular channel can be designed in such a way that a vibration of the fluid column in the annular channel develops, which vibration is specifically adjusted to a specific low-frequency vibration of the drive unit. In this range of maximum damping, the fluid column moving back and forth in the annular channel behaves like a hydraulic absorber. The vertical vibrations of the drive unit generated by the roadway are to be counteracted by the natural frequency of the drive unit.

The hydraulic damping of a drive train mount of this kind cannot be modified and cannot deal with all dynamic driving conditions and accelerations of the drive train to be mounted resulting therefrom.

DE 41 21 939 A1 shows and describes a drive train mount, in which an annular mount body made of an elastomer material assumes the static load-bearing function of the drive train mount. A second rubber-elastic mount body is integrated in the annular mount body, which mount body in turn works together with a mount core. The drive train mount thereby has a hydraulic damping function and a switchable, hydraulic absorber system.

EP 1 580 452 A1 describes a hydraulically damped drive train mount for motor vehicles having at least one first fluid chamber filled with hydraulic fluid and having at least one gas-filled equalization chamber. The drive train mount has a mount core that can be connected to the drive train that is to be mounted, such as an internal combustion engine. The mount core is housed in a body-mounted, cup-shaped mount housing. The drive train mount additionally has two functionally separated rubber-elastic mount bodies, to which the first fluid chamber and the equalization chamber are connected and divided by a nozzle body. The first fluid chamber faces away from the mount bodies or is separated by the nozzle body, respectively, and is pressurized with pressure from a pressurizing medium source or an unpressurized return line in defined frequencies.

The drive train mount has numerous components that possess predetermined elastic properties and due to the structure thereof, in particular when using a throttle in the form of the nozzle body functioning as a damping element, that drive train mount is relatively slow in its response behavior, which response behavior may lead to deviations in the control response.

SUMMARY OF THE INVENTION

An object of the invention is to provide an improved hydraulically damped drive train mount having low deviation in its control behavior with a large variance in the spring stiffness.

This object is basically achieved by a hydraulically damped drive train mount where the pressure in the equalization chamber can be adjusted by the sealing element formed as an axially displaceable piston. A very direct acting control element that can create fine pressure differences is provided in the drive train mount on the one hand, and on the other hand a possibility is created for the membrane that delimits the first fluid chamber from the equalization chamber to be able to bend and roll accordingly to temporarily allow a high degree of spring stiffness in the entire drive train mount. Due to this structural feature, higher loads can be temporarily absorbed than in known drive train mounts. The installation space of the drive train mount is not increased thereby, and the production cost for the drive train mount is low. Unlike the prior art, an increase in the control accuracy and an improvement in the response sensitivity can be achieved by displacing the piston in the equalization chamber as a control element for the pressure control. Depending on the fill level in the equalization chamber, the piston crown of the piston can serve as a supporting surface for the membrane or for an annular bead of the membrane, so that in addition, the static properties of the drive train mount are improved.

The piston itself is preferably not moved mechanically, but rather hydraulically. A second fluid chamber is disposed on the rear side of the piston crown, which can be pressurized by a pressurized fluid (liquid) or gaseous fluid.

The first fluid chamber is preferably filled with a mixture of water and glycol. The equalization chamber is filled with a low-viscosity hydraulic oil, which oil is available on the market under the brand name Pentosin®. The mixture of water and glycol can, for example, be composed in the manner of a frost-protecting coolant and may have an ethylene-glycol component comprising 30 to 50% of the total quantity of fluid such that it is readily possible to operate the drive train mount at temperatures as low as −35° C. The elastomer materials used in the drive train mount are not affected thereby. The rubber swelling, as well, falls in a range similar to that when water is used.

Preferably, the fluid that places a load on the piston to the equalization chamber is preloaded or pressurized in the second fluid chamber by a pressure transmitter. A pressure transmitter or pressure transformer is used especially in the case that supply or control pressures are to be reduced proportionally. In so doing, the pressure generated by the pressure transmitter is regulated at a fixed, constant ratio to the supplied pressure. For this purpose, the differential piston of the pressure transmitter is disposed in such a way, relative to the second fluid chamber, that the larger surface of the piston is directed towards the second fluid chamber. The fluid pressure for pressurizing the second fluid chamber and for moving the piston is provided by a pressurizing medium source, which comprises a pump and a pressure accumulator.

A pressure-control valve controls the pressurization of the second fluid chamber with pressure or the outflow of fluid in an unpressurized return line in definable frequencies. It can be actuated electrically and is preferably controlled by digital circuitry. Here, the smoothing low-pass action of an inductor such as a solenoid coil known from control engineering can be used. By controlling the solenoid coil of a pressure-control valve of this kind can result in a pre-definable, very finely adjustable force on the armature of the valve and on the control piston. Thus, by applying this principle, the position of the control piston in the pressure-control valve, which is directly related to the armature position, can be finely controlled. The solenoid coil of the pressure-control valve can be controlled with digital circuitry, such as a microcomputer, which in turn may be part of an electronic control unit ECU of a motor vehicle. The control unit can measure the accelerations at the drive train mounted by the drive train mount and at the body of the motor vehicle by sensors, and actively counteract the movement and vibration in the drive train through appropriate pressure control by the pressure-control valve with a very fine resolution. This arrangement can reduce vibration in the body of a motor vehicle and increase driving comfort.

To control the solenoid coil of the pressure-control valve, the control unit or the microcomputer generates a pulse-width modulated digital signal. The pulse-width modulation, abbreviated as PWM, is also referred to as pulse-duration modulation (PDM).

According to the invention, a stop valve is provided between the drive train mount and in particular between the pressure transmitter and the pressure-control valve. In the event of any malfunction in the pressure control of the second fluid chamber or in the event of a failure of the power supply to the pressure-control valve, the current fill level in the second fluid chamber can then be retained. The pressure of the pressurizing medium source can be adjusted by a pressure control valve.

To achieve a modular, simple structure of the drive train mount, advantageously the mount housing of the drive train mount is divided into multiple, individual segments, in particular in an annular shape. Advantageously a first segment can be rigidly connected with the elastic mount body. A second segment can preferably serve, on the one hand, to secure a membrane between the first and the second segment forming a seal, and on the other hand, to create an annular casing for the equalization chamber. The piston for the pressurization of the equalization chamber can be disposed in a third segment such that it is axially displaceable. The third segment can directly form a cylinder for the piston.

In a fourth segment of the mount housing, the pressure transmitter or a piston that pressurizes the second fluid chamber can be housed, which piston, together with the piston that pressurizes the equalization chamber, forms the actual pressure transmitter.

Similarly, the pressure-control valve can be disposed in the fourth segment. The segments of the mount housing can be assembled in a positive locking and releasable manner. Thus, threaded fasteners can be screwed through the respective casing of the first and third segments and can hold the segments disposed therebetween together in the manner of stud bolts.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings that form a part of this disclosure.

DETAILED DESCRIPTION OF THE INVENTION

Figure 1:
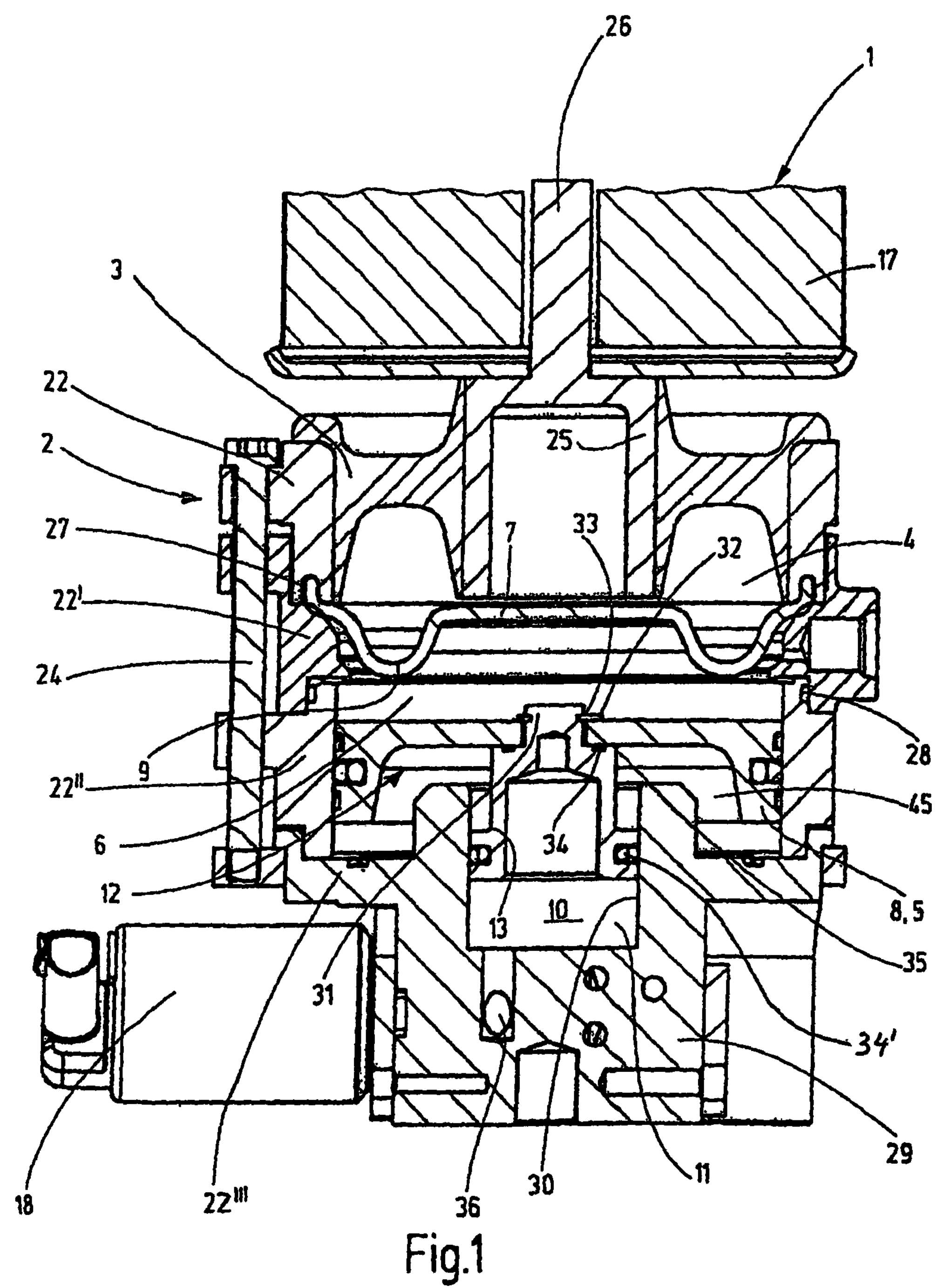
FIG. 1 is a schematic side view in section of a hydraulically damped drive train mount according to an exemplary embodiment the invention.

FIG. 1 shows a schematic longitudinal section, not to scale, of a hydraulically damped drive train mount 1 for the active mounting of a drive train 17 as an internal combustion engine, not shown in greater detail, in a chassis of a motor vehicle. The drive train mount 1 has a cupular mount housing 2 with an annular cross section. A mount body 3 made of an elastomer material is disposed on the upper surface of mount housing shown in FIG. 1 from the perspective of the viewer, wherein the mount body 3 forms a ring having a double-T-shaped cross section. The mount body 3 is connected to a first annular segment 22 of the mount housing 2 by vulcanization in a manner that forms a seal and projects over the first segment 22 at the upper edge thereof with a protruding ridge. A sleeve-shaped mount core 25 is vulcanized centrally in the mount body 2, from which a stud bolt 26 extends axially from the mount housing 2 upward.

The stud bolt 26 serves, among other things, to connect the drive train mount 1 to the drive train 17 being mounted, for example in the form of an internal combustion engine of a motor vehicle, which is shown only schematically in FIG. 1. The radial edge of a membrane 7 is inserted into a circumferential groove 27 on a side of the segment 22 of the mount housing 2 that faces the ridge of the mount body 3. The membrane 7 and the cross-sectional shape of the mount body 3 form a first fluid chamber 4, which first fluid chamber is filled with an incompressible mixture of water and glycol. The membrane 7 itself has an annular bead 9 in the region of the annular mount body 3, which bead protrudes axially away from the first fluid chamber 4. The membrane 7 is disposed in the axial region of a second annular segment 22' of the mount housing 2, wherein the second segment 22' encompasses approximately half of the outside of the lower half of the first segment 22 from below, so that the first segment 22 can be inserted into the second segment 22' from above. A thickening of the wall, which is radially directed towards the inside of the mount housing 2, is provided on the second segment 22' in the region of the radial edge of the membrane 7 as a stop for the first segment 22.

A radial edge on the second segment 22', in turn, protrudes in part over a third segment 22" of the mount housing 2, which is also annular. An O-Ring 28 as well as additional sealants, if necessary, are inserted in an annular groove on the outer circumference of the third segment 22" in the area of overlap of the two segments to create a seal. The third segment 22" of the mount housing 2 is formed as a cylinder for a piston 8 that is displaceable therein. The piston 8 has approximately the same cross sectional area as the mount body 3. The piston 8 forms a sealing element 5, which seals an equalization chamber 6 that lies between the membrane 7 and the piston 8 in the axial direction of the drive train mount 1. When viewed in terms of its inner pressure, the equalization chamber 6 can thus be modified by the displacement of the piston 8. The equalization chamber 6 is preferably filled with a low-viscosity hydraulic oil, in particular with Pentosin®. The annular bead 9 of the membrane 7 can move in the direction of the piston 8 in the case of any load peaks in the form of pressure applied to the mount body 3. Thus, higher loads and vibration amplitudes that emanate from the drive train 17 to be mounted, as is known in the prior art, can thereby be absorbed by the drive train mount 1.

A fourth segment 22''' of the mount housing 2 is formed as the base of the drive train mount 1 and has a cylindrical mating component 29 that protrudes axially downward to fix the drive train mount 1 to parts of a motor vehicle chassis, not shown in greater detail here. A cylindrical bore 30 is introduced in the center of the fourth segment 22''' that serves as a guide for an additional pressure piston, in particular in the form of a high-pressure piston 13. The high-pressure piston 13 can be displaced in the same direction as the piston 8 and is coupled with the piston 8 by a positive locking releasable, sealing connection. A pin 31 extends from the piston crown of the piston 8. A lock washer 32 is inserted into a circumferential groove 33 of the pin 31 for the positive releasable, sealing connection. Diametrically opposed to the lock washer 32, a sealing element formed as an O-ring 34 is inserted in an annular groove on an axial face 35 of the piston 13 and thereby seals the equalization chamber 6. An additional seal 34' is disposed on the high-pressure side of the arrangement between the chamber 11 and the chamber 45 on the outer circumference of the piston 13.

Pressure can be applied to the high-pressure piston 13 on the rear side thereof in the fourth segment 22''' by a fluid 10, in particular in the form of a hydraulic oil, by a pressurizing medium source 14. Thus, the piston 8, together with the high-pressure piston 13, forms a kind of pressure transmitter 12. A second fluid chamber 11 on the rear side of the high-pressure piston 13 can be connected to the pressurizing medium source 14 by a line 36 that passes radially through the fourth segment 22''' of the mount housing 2. All four segments 22, 22', 22'' and 22''' of the mount housing 2 are connected to one another by a positive locking releasable connection using three threaded fasteners 24 (c.f. also FIG. 3).

Figure 2:
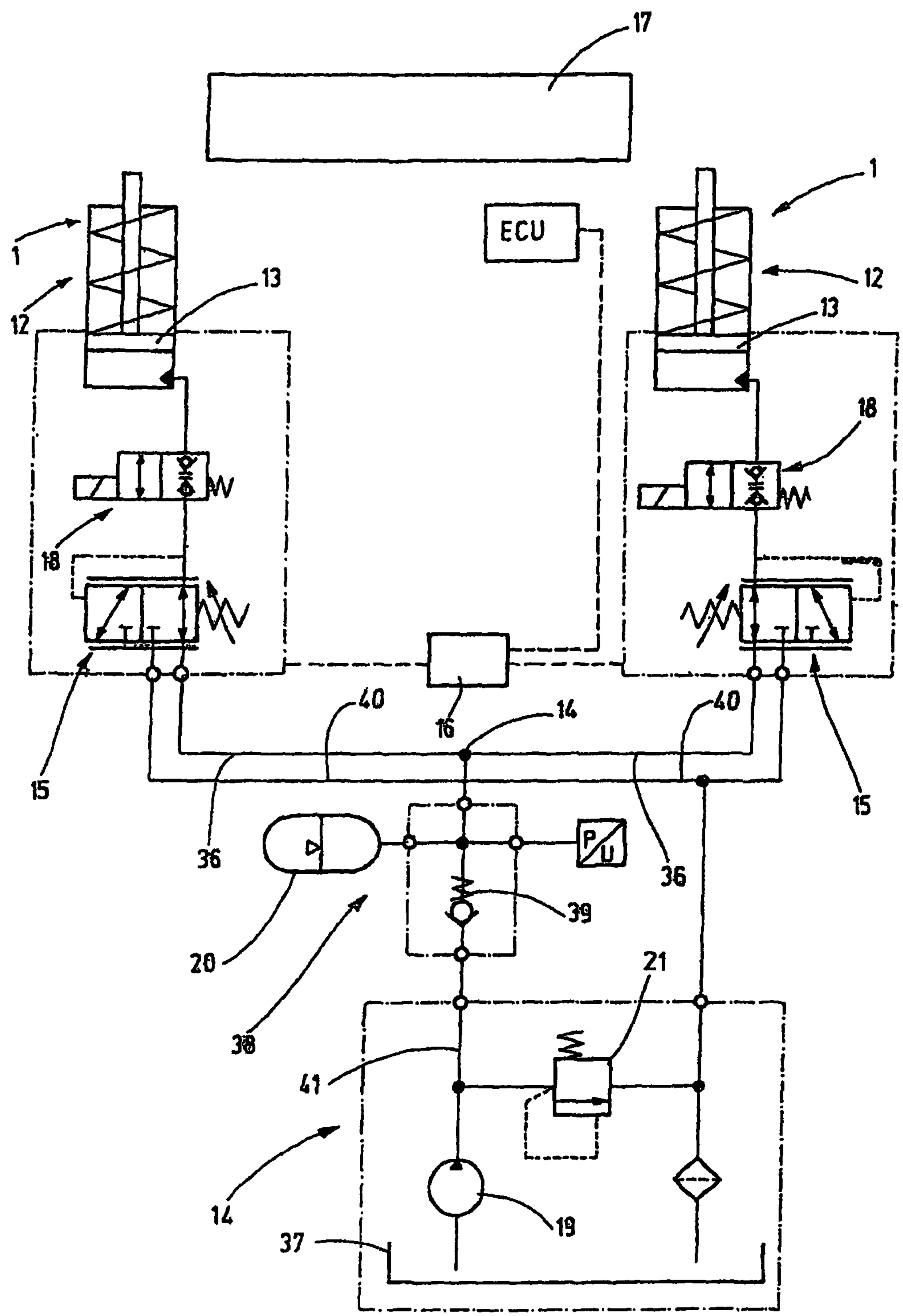
FIG. 2 is a circuit diagram of a control system for the hydraulically damped drive train mount according to FIG. 1.

As the circuit diagram according to FIG. 2 shows, the pressurizing medium source 14 comprises in particular a pressurizing medium pump 19 that conveys pressurizing medium from a pressurizing medium container 37 (tank) to a pressure-control valve 15 for the respective drive train mount 1, and to an accumulator block 38 together with a pressure accumulator 20. A pressure-control valve 15 is allocated to each drive train mount 1. The accumulator block 38 can be disconnected from the pressurizing medium pump 19 by a check valve 39 and has an electric drive for the filling of the pressure accumulator 20 and the pressurization of the drive train mounts 1. A stop valve 18 is provided between each pressure-control valve 15 and the respective high-pressure piston 13. The stop valve 18 is formed in particular as an electrically controlled 2/2-way valve and serves to block the fluid-conducting connection from the pressurizing medium pump 19 to the high-pressure piston 13 of each drive train mount 1, for example in the event of a power failure or in the event that the drive train 17 being mounted is taken out of operation. An unpressurized return-flow line 40 is directed from each pressure-control valve 15 to the pressurizing medium container 37. Thus, during operation, each pressure-control valve 15 alternatively connects a pressurized flow line 36 or the respective return-flow line 40 to the rear side of the high-pressure piston 13 and in this respect, to the second fluid chamber 11. The delivery pressure of the pressurizing medium pump 19 can be adjusted in a conventional manner by a pressure control valve 21.

Each pressure-control valve 15 of each drive train mount 1, shown FIG. 2 and supplied by a common pressurizing medium source 14, is preferably formed as a pulse-width modulated, electrically controlled 3/2-way valve or pressure-reducing valve. Digital circuitry 16, which can be part of a microcomputer of the motor vehicle, thereby provides a pulse-width modulated digital signal, which generates a very finely adjustable force on a magnetic armature (not shown) of the respective pressure-control valve 15. The Position of a control piston of the pressure-control valve 15 is thus directly dependent on the respective position of the armature. The fact that a pressure transmitter 12 is formed in the drive train mount 1, which controls the pressure on the equalization chamber 6 and the pressure that is thereby propagated in the first fluid chamber 4 permits controlling the drive train mount 1 very directly and in this way, applying very high thrust and/or pressure forces to the mount body 3 and the drive train 17.

Operating data from the internal combustion engine, such as the engine speed, accelerations in all axes of the drive train 17 and accelerations by the motor vehicle frame are supplied to the digital circuitry 16. The respective pressure-control valve 15 can be individually controlled by an amplifier stage. The digital circuitry 16 may contain a control strategy to the extent that the pressure control in the second fluid chamber 11 is effected in such a way that a vibration reduction of the body of the motor vehicle and therefore a significantly increased driving comfort of the motor vehicle is achieved.

Figure 3:
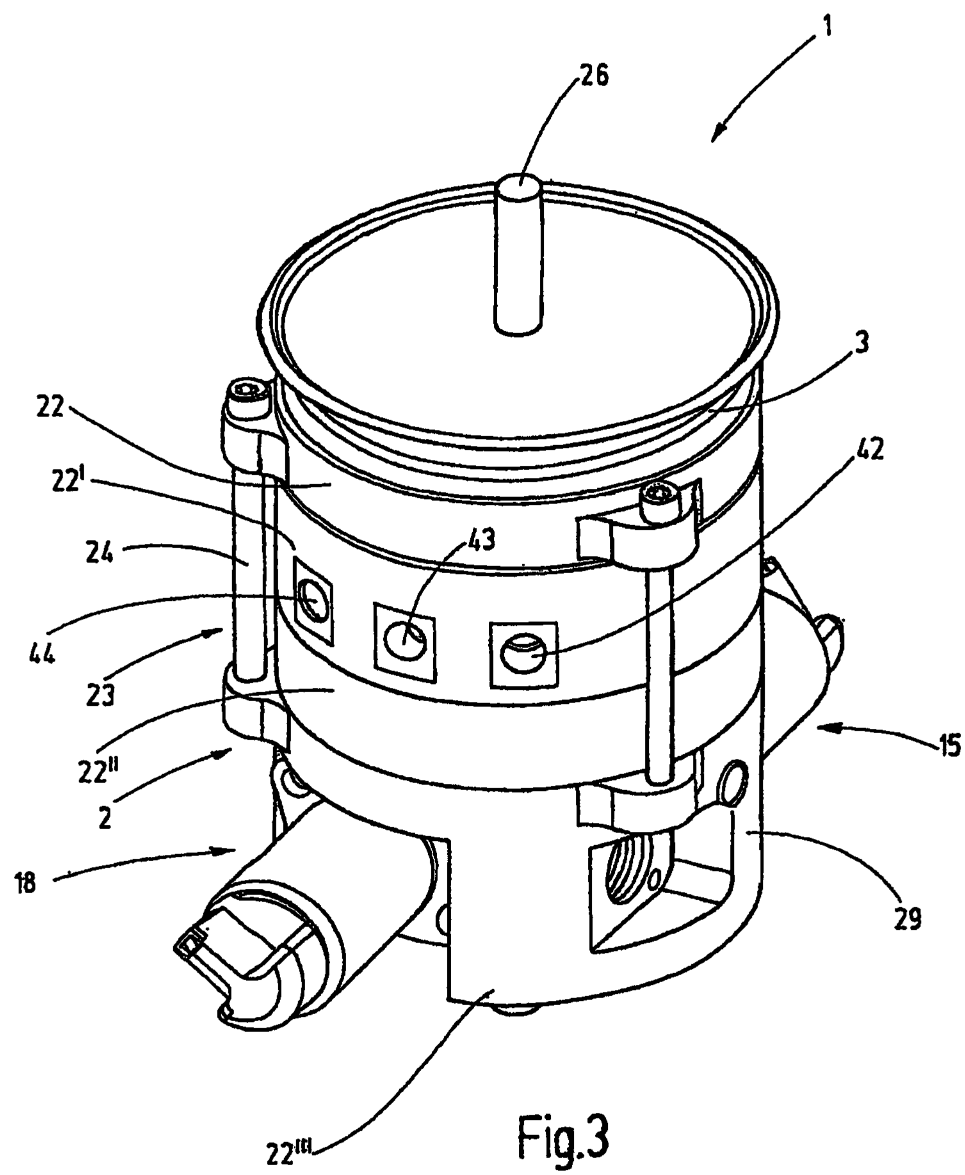
FIG. 3 is a perspective view of the hydraulically damped drive train mount according to FIG. 1.

FIG. 3 shows a perspective view of the drive train mount 1 in a compact design, in particular made possible by the fact that the pressure-control valve 15 as well as the stop valve 18 are integrated as part of the drive train mount 1. The valves 15, 18 of that sort are screwed into the fourth segment 22''' of the mount housing 2 in the manner of a cartridge solution. Various filling ports can be seen on the outside of the mount housing 2. Thus, a filling port 42 is provided for the Pentosin® in the equalization chamber 6, as well as a filling port 43 that flows into the wall of the second segment 22' for the mixed solution of water and glycol, which solution is received from the first fluid chamber 4. In addition, an air vent 44 for the rear piston chamber 45 of the piston 8 can be seen.

While one embodiment has been chosen to illustrate the invention, it will be understood by those skilled in the art that various changes and modifications can be made therein without departing from the scope of the invention as defined in the claims.

The invention claimed is:

1. A hydraulically damped drive train mount, comprising;

a mount housing;

an elastic mount body disposed in and at least partially displaceable in said mount housing, said elastic mount at least partially enclosing a first fluid chamber in said mount housing;

a fluid-filled equalization chamber sealed by a sealing element that can be displaced in said mount housing;

a membrane disposed in said mount housing and separating said first fluid chamber from said equalization chamber, pressure in said equalization chamber being adjustable by said sealing element, said sealing element being a piston that is axially displaceable in said mount housing and is pressurized by at least one of a fluid medium or a gaseous medium enclosed in a second fluid chamber in said mount housing, said second fluid chamber being opposite said equalization chamber relative to said sealing element, said piston including a high pressure piston part in said second fluid chamber and a low pressure piston part bordering said equalization chamber, said high pressure piston part having a smaller transverse diameter than said low pressure piston part; and a pressure transmitter preloading a pressure medium in said equalization chamber.

2. A hydraulically damped drive train mount according to claim 1 wherein said membrane comprises an annular bead.

3. A hydraulically damped drive train mount according to claim 1 wherein said first fluid chamber is filled with a mixture of water and glycol.

4. A hydraulically damped drive train mount according to claim 1 wherein said equalization chamber is filled with a low-viscosity hydraulic oil.

5. A hydraulically damped drive train mount according to claim 1 wherein the second fluid chamber has hydraulic oil therein, said hydraulic oil being pressurized by a high-pressure piston of said pressure transmitter.

6. A hydraulically damped drive train mount according to claim 1 wherein a pressure medium source and a pressure-control valve are in fluid communication with said second fluid chamber and pressurize the fluid medium or the gaseous medium with pressure at defined frequencies or connect the second fluid chamber to an unpressurized return line with the defined frequencies.

7. A hydraulically damped drive train mount according to claim 6 wherein said pressure medium source comprises a hydraulic pump and a pressure accumulator.

8. A hydraulically damped drive train mount according to claim 6 wherein pressure of said pressure source is controlled by a pressure control valve.

9. A hydraulically damped drive train mount according to claim 6 wherein said mount housing is subdivided in an axial direction thereof into at least first and second segments, said first segment being rigidly connected to said elastic mount body.

10. A hydraulically damped drive train mount according to claim 9 wherein said membrane is fixed between said first and second segments.

11. A hydraulically damped drive train mount according to claim 9 wherein said piston is guided in a third segment of said mount housing for axial displacement.

12. A hydraulically damped drive train mount according to claim 11 wherein said pressure transmitter is partially disposed in a fourth segment of said mount housing, said pressure-control valve being disposed in the fourth segment of said mount housing, said segments of said mount housing being connected to one another by a positive locking releasable connection.

13. A hydraulically damped drive train mount according to claim 12 wherein said positive locking connection comprises threaded fasteners extending through at least said first segment and said fourth segment of said mount housing.

14. A hydraulically damped drive train mount according to claim 6 wherein said pressure-control valve is electrically actuated and is connected to and controlled by a digital circuit.

15. A hydraulically damped drive train mount according to claim 14 wherein said digital circuit is part of an electronic control unit of a motor vehicle, said electronic control unit being connected to the drive train mount to measure accelerations at a drive train and a body of the motor vehicle, and to actively counteract movements and vibrations in the drive train by controlling pressure in said second fluid chamber.

16. A hydraulically damped drive train mount according to claim 14 wherein said pressure-control valve is controlled by a pulse-width modulated digital signal.

17. A hydraulically damped drive train mount according to claim 14 wherein a stop valve is in fluid communication between said mount housing and said pressure-control valve.

18. A hydraulically damped drive train mount comprising:

a mount housing;

an elastic mount body disposed in and at least partially displaceable in said mount housing, said elastic mount at least partially enclosing a first fluid chamber in said mount housing;

a fluid-filled equalization chamber sealed by a sealing element movable in said mount housing;

a membrane disposed in said mount housing and separating said first fluid chamber from said equalization chamber, pressure in said equalization chamber being adjustable by said sealing element, said sealing element being a piston that is axially displaceable in said mount housing and is pressurized by a medium in second fluid chamber in said mount housing;

a pressure medium source and a pressure-control valve in fluid communication with said second fluid chamber; and a stop valve in fluid communication between said mount housing and said pressure-control valve.

19. A hydraulically damped drive train mount according to claim 18 wherein said equalization chamber and said second fluid chamber are on opposite sides of said sealing element.

20. A hydraulically damped drive train mount comprising:

a mount housing subdivided in an axial direction by at least first, second, third and fourth segments connected a positive locking releasable connection;

an elastic mount body disposed in and at least partially displaceable in said mount housing, said elastic mount at least partially enclosing a first fluid chamber in said mount housing and being fixed between said first and second segments;

a fluid-filled equalization chamber sealed by a sealing element movable in said mount housing;

a membrane disposed in said mount housing and separating said first fluid chamber from said equalization chamber, pressure in said equalization chamber being adjustable by said sealing element, said sealing element being a piston that is axially displaceable in said third segment of said mount housing and is pressurized by a medium in second fluid chamber in said fourth segment;

a pressure medium source and a pressure-control valve in fluid communication with said second fluid chamber; and a pressure transmitter preloading a pressure medium in said equalization chamber, said force transmitter being partially disposed in said fourth segment, said pressure-control valve being in said fourth segment.

* * * * *